(12) United States Patent
Schwiesow et al.

(10) Patent No.: US 10,977,821 B2
(45) Date of Patent: Apr. 13, 2021

(54) HIGH ACCURACY EXTRINSIC CALIBRATION PROCEDURE FOR CAMERAS AND RANGE SENSORS

(71) Applicant: The Boeing Company, Chicago, IL (US)

(72) Inventors: Michael B. Schwiesow, Madison, AL (US); Anthony W. Baker, Gilbertsville, PA (US)

(73) Assignee: The Boeing Company, Chicago, IL (US)

( * ) Notice: Subject to any disclaimer, the term of this patent is extended or adjusted under 35 U.S.C. 154(b) by 124 days.

(21) Appl. No.: 16/439,600

(22) Filed: Jun. 12, 2019

(65) Prior Publication Data

US 2020/0394816 A1 Dec. 17, 2020

(51) Int. Cl.
  *G06T 7/73* (2017.01)
  *G01S 17/89* (2020.01)
  *G06T 7/80* (2017.01)

(52) U.S. Cl.
  CPC ............ *G06T 7/73* (2017.01); *G01S 17/89* (2013.01); *G06T 7/80* (2017.01)

(58) Field of Classification Search
  CPC combination set(s) only.
  See application file for complete search history.

(56) References Cited

U.S. PATENT DOCUMENTS

| | | | | |
|---|---|---|---|---|
| 6,512,838 B1* | 1/2003 | Rafii | ............ | G01S 17/89 382/106 |
| 7,209,161 B2* | 4/2007 | Thal | ............ | H04N 13/296 348/42 |
| 7,236,613 B2* | 6/2007 | Murata | ............ | G01S 17/46 382/103 |
| 10,838,049 B1* | 11/2020 | Schwiesow | ............ | G01S 7/4972 |

(Continued)

OTHER PUBLICATIONS

Lao et al.; "Extrinsic Calibration of 3D Range Finder and Camera without Auxiliary Object or Human Intervention"; arXiv: 1703.04391v1 [cs.CV]; Mar. 2, 2017; 7 pages.

(Continued)

*Primary Examiner* — Tsung Yin Tsai
(74) *Attorney, Agent, or Firm* — Haynes and Boone LLP

(57) ABSTRACT

In one or more embodiments, a system for calibration between a camera and a ranging sensor comprises a ranging sensor to obtain ranging measurements for a target located at N number of locations with an emitter at M number of rotation positions. The system further comprises a camera to image the target to generate imaging measurements corresponding to the ranging measurements. Further, the system comprises a processor(s) to determine replacement ranging measurements that all lie in the same plane; to sample the replacement ranging measurements to produce sampled replacement ranging measurements; to determine sampled replacement imaging measurements corresponding to the sampled replacement ranging measurements; and to calculate calibration parameters by using some of the sampled (Continued)

replacement ranging measurements and the sampled replacement imaging measurements corresponding to the sampled replacement ranging measurements that are used, where the calibration parameters estimate the relationship of the camera to the ranging sensor.

20 Claims, 15 Drawing Sheets

(56) References Cited

U.S. PATENT DOCUMENTS

2011/0205186 A1* 8/2011 Newton ............... G06F 3/017 345/175
2014/0174149 A1* 6/2014 Wicks ................. G01S 17/48 73/1.79

OTHER PUBLICATIONS

Gong et al; "3D LIDAR-Camera Extrinsic Calibration Using an Arbitrary Trihedron"; Sensors 2013, 13, 1902-1918; doi: 10.3390/s130201902; pp. 1902-1918.

Zhang et al.; "Extrinsic Calibration of a Camera and Laser Range Finder (improves camera calibration)"; 2004 IEEE/RSJ International Conference on Intelligent Robots and Systems, Sep. 28-Oct. 2, 2004, Sendai, Japan; pp. 2301-2306.

Dong et al.; "A Novel Method for Extrinsic Calibration of a 2-D Laser-Rangefinder and a Camera"; arXiv:1603.04132v2 [cs.CV] Mar. 15, 2016; pp. 1-13.

Park et al.; "Calibration between Color Camera and ED LIDAR Instruments with a Polygonal Planar Board"; Sensors 2014, 14, 5333-5353; doi:10.3390/s140305333; pp. 5333-5353.

* cited by examiner

HIGH ACCURACY EXTRINSIC CALIBRATION PROCEDURE FOR CAMERAS AND RANGE SENSORS

FIELD

The present disclosure relates to calibration procedures for cameras and range sensors. In particular, the present disclosure relates to high accuracy extrinsic calibration procedures for cameras and range sensors.

BACKGROUND

Establishing accurate extrinsic calibration between a camera and a ranging sensor is a challenging problem, particularly for systems designed to scan objects further away than one meter. The current literature boasts state-of-the-art results achieving centimeter to millimeter order accuracy. However, this is insufficient for high precision metrology at large standoff distances (e.g., six (6) meters), where submillimeter accuracy is often desired for the final results.

In light of the foregoing, there is a need for an improved technology for achieving submillimeter extrinsic calibration accuracy between a camera and a ranging sensor capable of repeatable position measurements.

SUMMARY

The present disclosure relates to a method, system, and apparatus for a high accuracy extrinsic calibration procedure for cameras and range sensors. In one or more embodiments, a method for calibration between a camera and a ranging sensor comprises obtaining, by the ranging sensor, ranging measurements for a target located at N (e.g., four (4)) number of locations with an emitter at M (e.g., four (4)) number of rotation positions. The method further comprises imaging, by the camera, the target to generate imaging measurements corresponding to the ranging measurements. Also, the method comprises determining, by at least one processor, replacement ranging measurements by using the ranging measurements such that the replacement ranging measurements all lie in a same plane. Also, the method comprises sampling, by at least one processor, the replacement ranging measurements to produce sampled replacement ranging measurements, which comprise N number of the replacement ranging measurements for each of the rotation positions of the emitter. In addition, the method comprises determining, by at least one processor, sampled replacement imaging measurements corresponding to the sampled replacement ranging measurements. Further, the method comprises calculating, by at least one processor, calibration parameters by using one of the sampled replacement ranging measurements for each of the rotation positions of the emitter, and using the sampled replacement imaging measurements corresponding to the sampled replacement ranging measurements for each of the rotation positions of the emitter that are used, where the calibration parameters estimate a relationship of the camera to the ranging sensor.

In one or more embodiments, the method further comprises repeating, by at least one processor, the preceding calibration steps X–1 number of times to obtain X (e.g., 256) number of sets of the calibration parameters. Also, the method comprises processing, by at least one processor, the X number of sets of the calibration parameters to determine final calibration parameters, where the final calibration parameters estimate the relationship of the camera to the ranging sensor.

In at least one embodiment, the processing, by at least one processor, of the X number of sets of the calibration parameters comprises computing statistics of the X number of sets of the calibration parameters. In some embodiments, the statistics comprise a mean and/or a standard deviation. In one or more embodiments, the processing, by at least one processor, of the X number of sets of the calibration parameters further comprises removing outliers from the statistics that are computed.

In at least one embodiment, the obtaining, by the ranging sensor, the ranging measurements comprises transmitting, by the emitter at M number of the rotation positions, transmit signals to the target located at N number of the locations; generating, by the transmit signals reflecting off of the target, reflection signals; receiving, by the ranging sensor, the reflection signals; and generating, by the ranging sensor, ranging measurements from the reflection signals.

In one or more embodiments, the transmit signals are optical signals or infrared signals.

In at least one embodiment, at least two of the image measurements are obtained for each of the locations of the target while the emitter is in one of the rotation positions. In some embodiments, at least two of the ranging measurements are obtained for each of the locations of the target while the emitter is in one of the rotation positions.

In one or more embodiments, at least one processor is located within the camera, within the ranging sensor, or remote from the camera and the ranging sensor.

In at least one embodiment, the ranging sensor comprises the emitter.

In one or more embodiments, a system for calibration between a camera and a ranging sensor comprises a ranging sensor to obtain ranging measurements for a target located at N number of locations with an emitter at M number of rotation positions. The system further comprises a camera to image the target to generate imaging measurements corresponding to the ranging measurements. Further, the system comprises at least one processor to determine replacement ranging measurements by using the ranging measurements such that the replacement ranging measurements all lie in a same plane; to sample the replacement ranging measurements to produce sampled replacement ranging measurements, which comprise N number of the replacement ranging measurements for each of the rotation positions of the emitter; to determine sampled replacement imaging measurements corresponding to the sampled replacement ranging measurements; and to calculate calibration parameters by using one of the sampled replacement ranging measurements for each of the rotation positions of the emitter, and using the sampled replacement imaging measurements corresponding to the sampled replacement ranging measurements for each of the rotation positions of the emitter that are used, where the calibration parameters estimate a relationship of the camera to the ranging sensor.

In at least one embodiment, at least one processor is further to repeat the calibration process X–1 number of times to obtain X number of sets of the calibration parameters, and to process the X number of sets of the calibration parameters to determine final calibration parameters, where the final calibration parameters estimate the relationship of the camera to the ranging sensor.

In one or more embodiments, at least one processor is further to process the X number of sets of the calibration parameters by computing statistics of the X number of sets of the calibration parameters.

In at least one embodiment, the emitter is further to transmit at M number of the rotation positions, transmit signals to the target located at N number of the locations, where the transmit signals reflecting off of the target generate reflection signals. Also, the ranging sensor is further to receive the reflection signals, and to generate ranging measurements from the reflection signals.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

Figure 9:
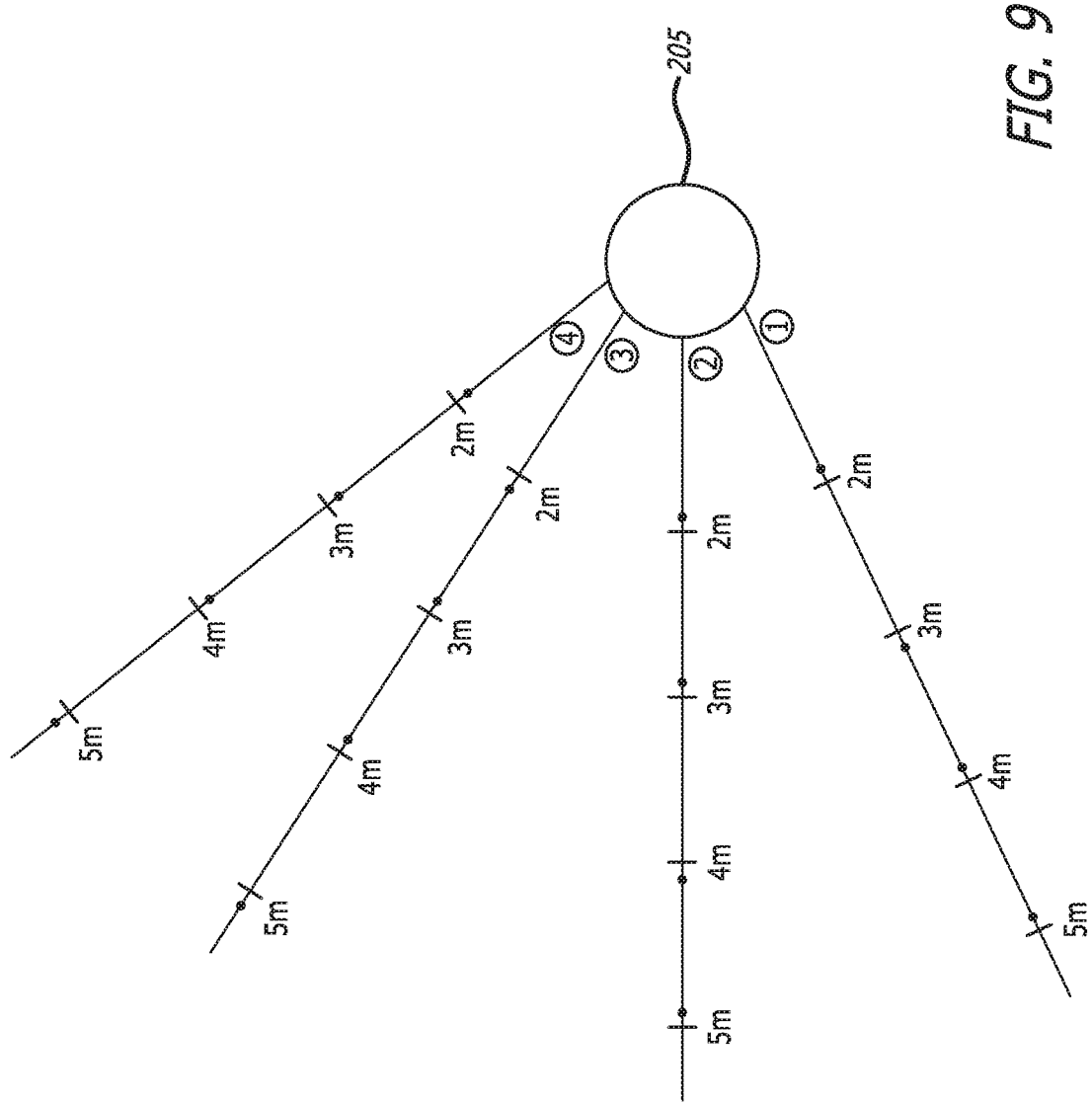

FIG. 9 is a diagram showing sampled replacement ranging measurements, which all lie within the same plane, generated from all of the ranging measurements taken (i.e. all of the ranging measurements from FIGS. 4, 5, 6, and 7) when the target is located at four different locations, while the emitter (of the ranging sensor) is located in all four of the rotation positions, in accordance with at least one embodiment of the present disclosure.

Figure 10:
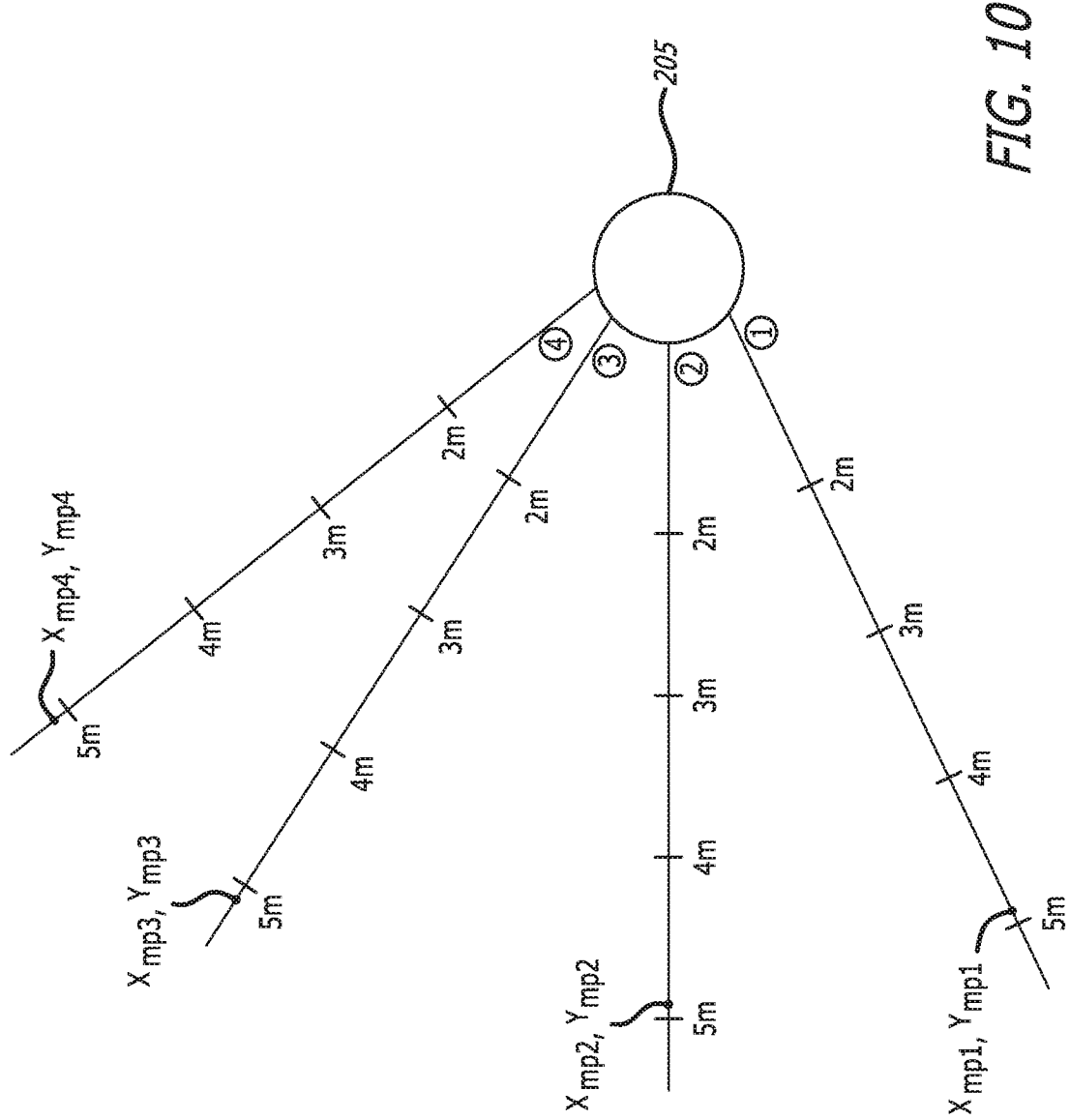

FIG. 10 is a diagram showing one of the sampled ranging measurements (i.e. Xmp1, Ymp1; Xmp2, Ymp2; Xmp3, Ymp3; and Xmp4, Ymp4) for each of the four rotation positions of the emitter (of the ranging sensor), in accordance with at least one embodiment of the present disclosure.

Figure 11A:
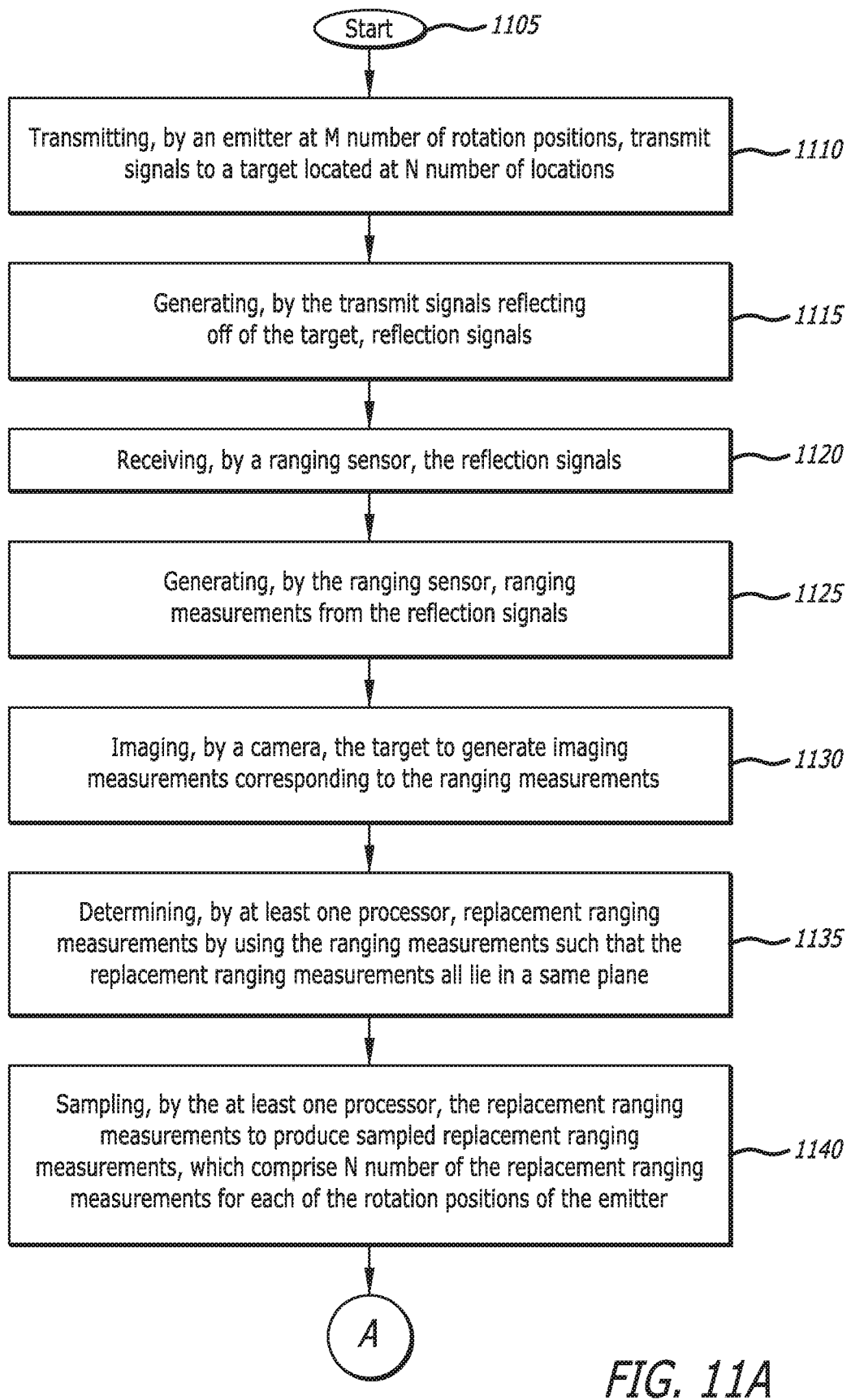
Figure 11B:
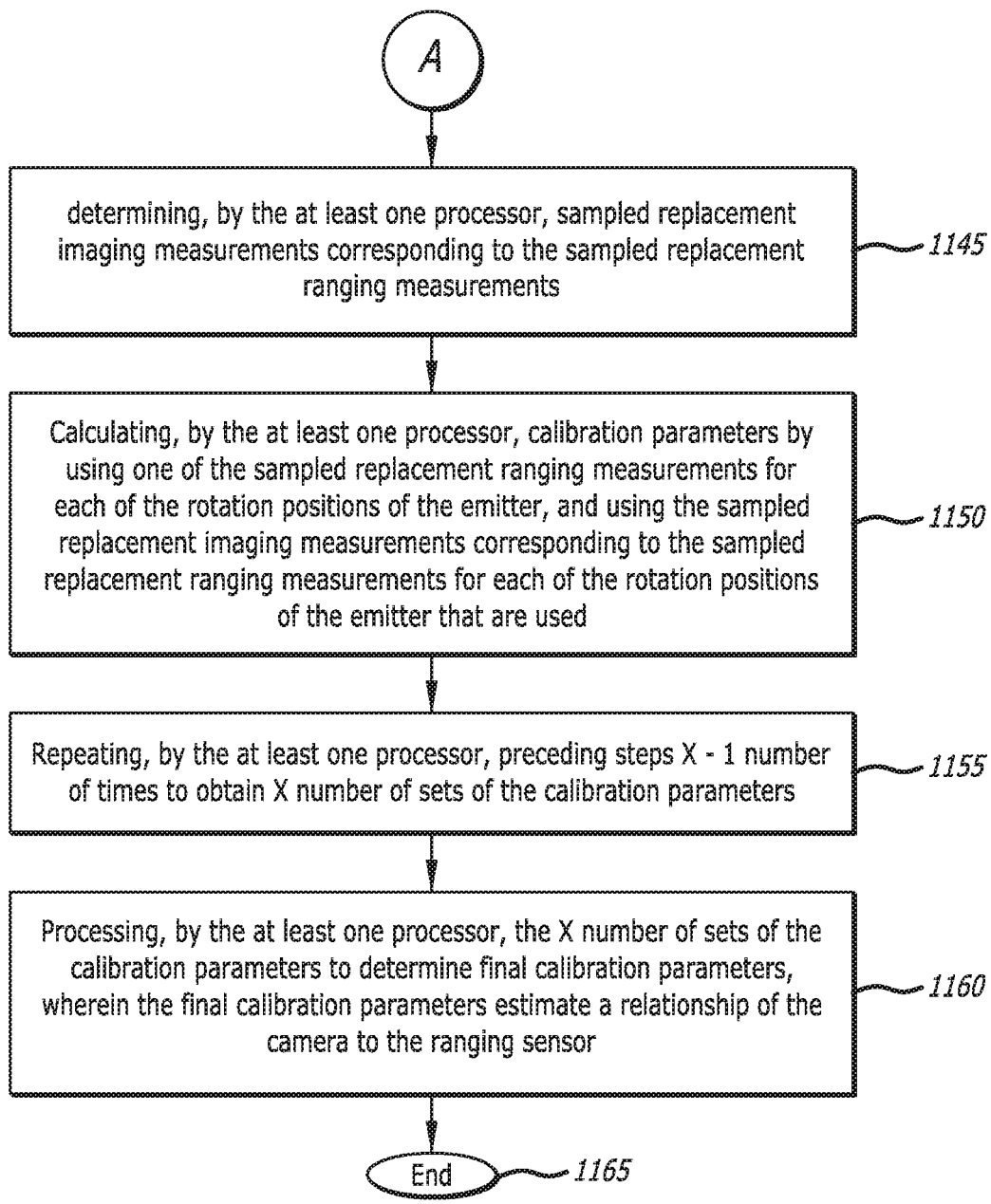

FIGS. 11A and 11B together show a flow chart for the disclosed method for calibration between a camera and a ranging sensor, in accordance with at least one embodiment of the present disclosure.

Figure 12:
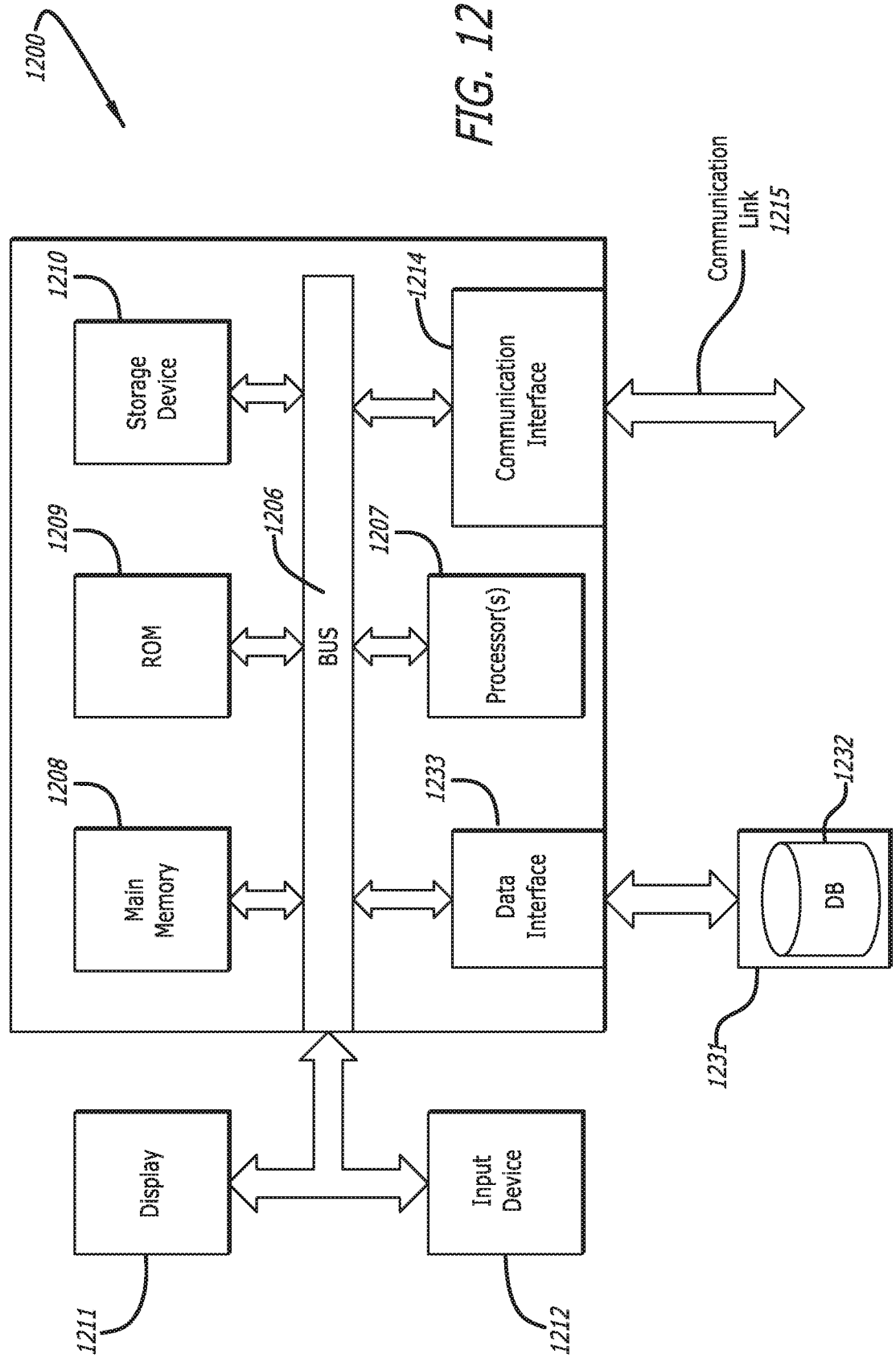

FIG. 12 illustrates a block diagram of an illustrative computing system suitable for implementing an embodiment of the present disclosure, in accordance with at least one embodiment of the present disclosure.

Figure 13:
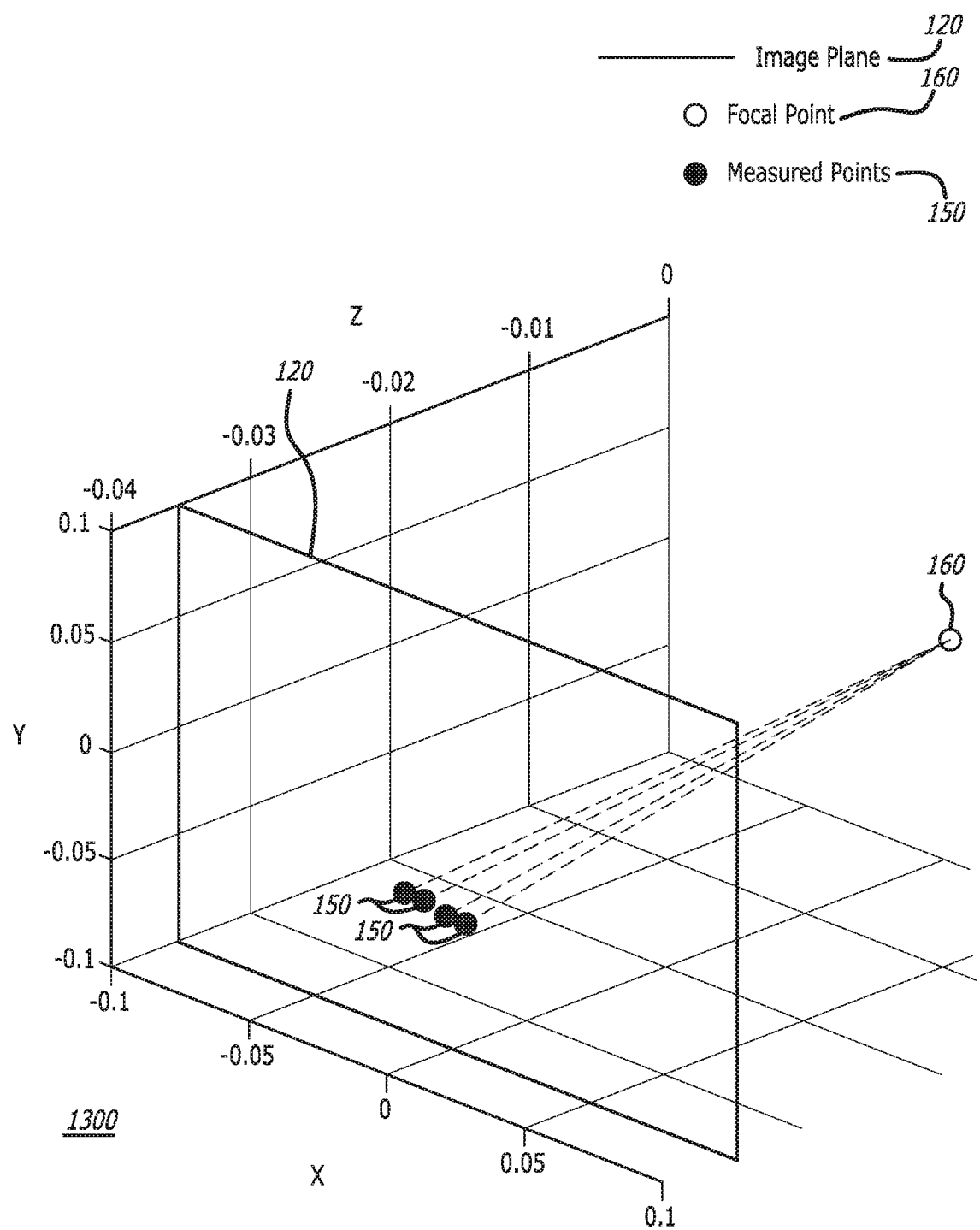

FIG. 13 is a three-dimensional graph showing the image plane in the image plane (IP) coordinate system for the disclosed system for calibration between a camera and a ranging sensor, in accordance with at least one embodiment of the present disclosure.

Figure 14:
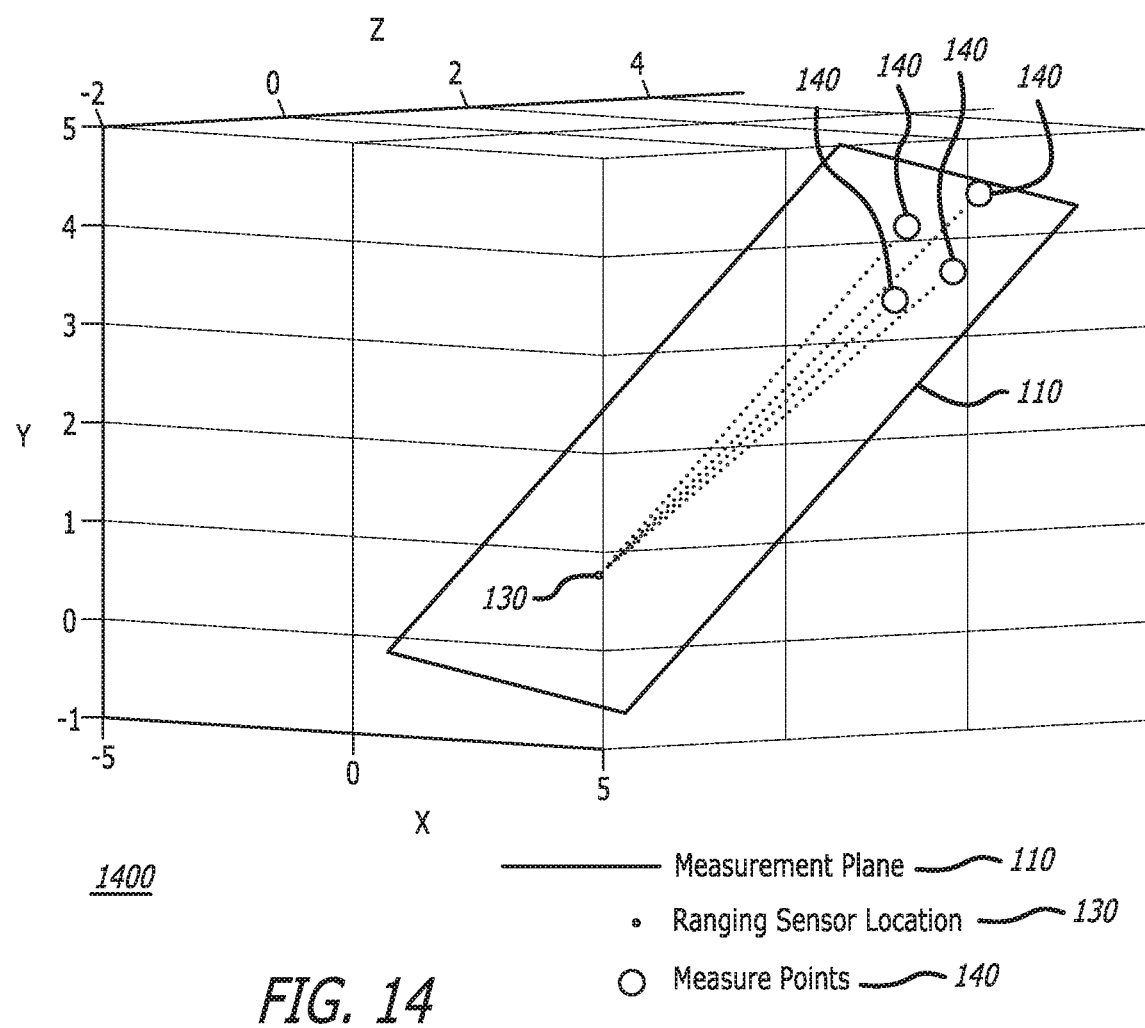

FIG. 14 is a three-dimensional graph showing the measurement plane in the measurement plane (MP) coordinate system for the disclosed system for calibration between a camera and a ranging sensor, in accordance with at least one embodiment of the present disclosure.

DESCRIPTION

The methods and apparatus disclosed herein provide an operative system for a high accuracy extrinsic calibration procedure for cameras and range sensors. In one or more embodiments, the system of the present disclosure provides extrinsic calibration parameters which allow for submillimeter accuracy in the final answer when measuring range from a camera to an imaged object at a large standoff distance (e.g., six (6) meters). The disclosed system solves the problem of placing an imaging sensor (e.g., a camera) and a ranging sensor into a common reference frame with submillimeter accuracy through an extrinsic calibration procedure. This allows the information, provided by each (i.e. the imaging sensor and ranging sensor) individually, to be fused together for use in high precision metrology systems or autonomous vehicles.

As previously mentioned above, establishing accurate extrinsic calibration between a camera and a ranging sensor is a challenging problem, particularly for systems designed to scan objects further away than one meter. The current literature boasts state-of-the-art results achieving centimeter to millimeter order accuracy. However, this is insufficient for high precision metrology at large standoff distances (e.g., six (6) meters), where submillimeter accuracy is often desired for the final results.

The system of the present disclosure employs a novel approach for achieving submillimeter extrinsic calibration accuracy between a camera and ranging systems capable of repeatable position measurements. The disclosed approach applies to targets that are more than one meter away from the coupled camera and ranging sensor. In particular, specific aspects of the system of the present disclosure that are novel are the collection of required data and the construction of a nonlinear cost function to allow determination of a sub-pixel location, while simultaneously collecting the data required for solving a final nonlinear cost function.

In the following description, numerous details are set forth in order to provide a more thorough description of the system. It will be apparent, however, to one skilled in the art, that the disclosed system may be practiced without these specific details. In the other instances, well known features have not been described in detail, so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the systems described herein are merely example embodiments of the present disclosure.

For the sake of brevity, conventional techniques and components related to cameras and range sensors, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in one or more embodiments of the present disclosure.

I. Disclosed Systems and Methods

Figure 1:
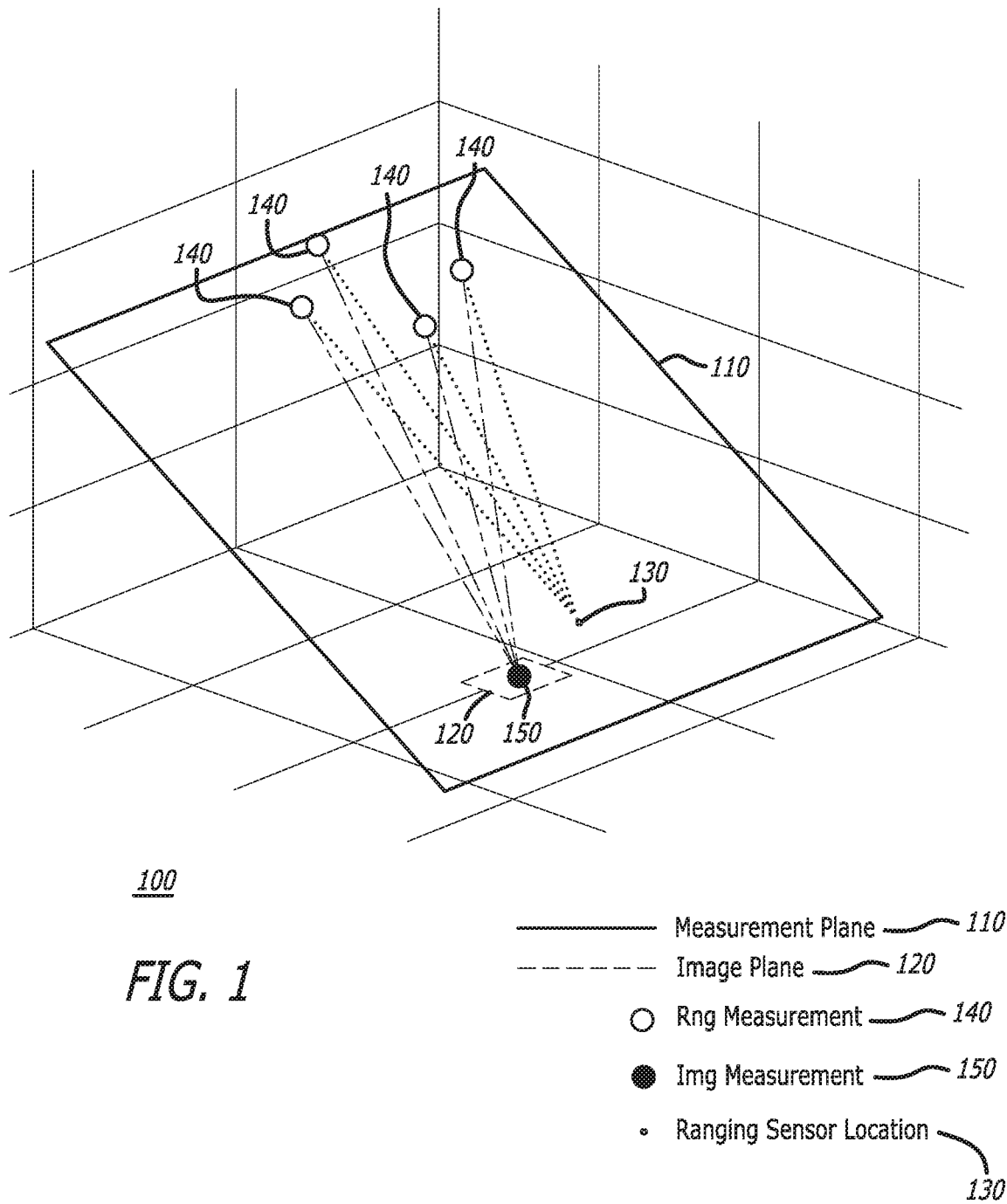
FIG. 1 is a three-dimensional graph illustrating the relationship between the measurement plane and image plane for the disclosed system for calibration between a camera and a ranging sensor, in accordance with at least one embodiment of the present disclosure.
Figure 2:
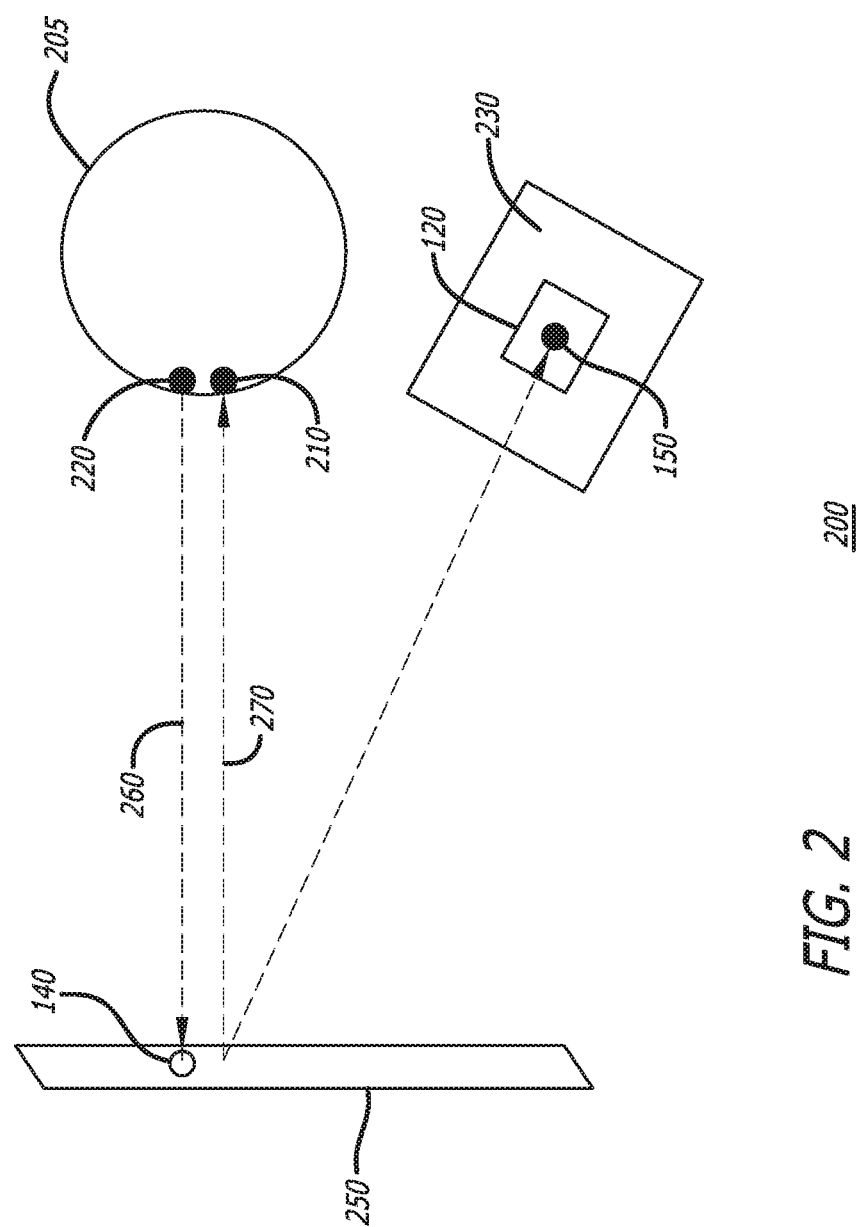
FIG. 2 is a diagram showing the disclosed system for calibration between a camera and a ranging sensor, in accordance with at least one embodiment of the present disclosure.

Conceptually, the disclosed calibration systems and methods consist of determining the orientation and offset of a measurement plane (MP) 110 (defined by ranging measurements 140) with respect to the image plane (IP) 120 (and focal point 160) of a camera 230 (refer to FIGS. 1, 2, and 13). FIG. 1 is a three-dimensional graph 100 illustrating the relationship between the measurement plane 110 and image plane 120 for the disclosed system for calibration between a camera 230 (refer to FIG. 2) and a ranging sensor 205 (refer to FIG. 2), in accordance with at least one embodiment of the present disclosure. In this graph 100, the ranging sensor 205 is located at a ranging sensor location 130 shown on the graph 100, and the image plane 120 is the image plane located within the camera 230. During operation of the disclosed system, ranging (Rng) measurements 140 and imaging (Img) measurements 150 are obtained.

In theory, there is a unique solution to the system of non-linear equations governing this relationship, which can be determined by simultaneously observing N (e.g., four (4)) number of separate ranging measurements 140 in a single plane (i.e. a single scan line obtained from light detection and ranging (lidar) or by scanning a rangefinder) and the location of those measurements in the resulting camera images (e.g., imaging measurements 150). However, in practice, pixel quantization results in a violation of the planar assumption requisite for the solution of the problem. This necessitates estimation of the sub-pixel location of the observed range points before attempting to solve the system of nonlinear equations to obtain the calibration parameters.

The disclosed systems and methods employ a camera system that is capable of imaging the output of a ranging sensor 205 (refer to FIG. 2). This can be accomplished by various different means including, but not limited to, pairing a regular camera 230 (refer to FIG. 2) with a visible spectrum range finder, by removing any infrared (IR) filtering from a regular camera 230 while calibration is being performed, and by using two time-of-flight cameras. In addition, for the disclosed systems and methods, the camera position and orientation must remain fixed while the ranging measurements are collected.

Additionally, for the disclosed systems and methods, the angle step size between ranging measurements must be accurately known. This is generally the case for scanning lidars or time-of-flight cameras. For a scanning rangefinder, this will depend on the servo system used.

Also, for the disclosed systems and methods, the emitter 220 (refer to FIG. 2) direction of the ranging sensor 205 (refer to FIG. 2) must be within approximately four (4) degrees of orthogonal to the scanning axis. When the emitter 220 direction is perfectly orthogonal, the measurements will make a circle lying in the desired plane. When not orthogonal, the scan will generate a cone, presenting infinitely many possible planes. For example, four (4) points are measured at different ranges; this corresponds to a line along the side of the cone and establishes the tangent plane at the first measurement angle. Then, the emitter 220 is scanned (i.e. rotated along the cone). By definition, the new tangent plane will be different. It should be noted that, in practice, the disclosed systems and methods have been found to be robust to small angular offsets.

FIG. 2 is a diagram showing the disclosed system for calibration between a camera 230 and a ranging sensor 205, in accordance with at least one embodiment of the present disclosure. The ranging sensor 205 comprises an emitter 220 and a receiver 210. During operation of the disclosed system, the emitter 220 of the ranging sensor 205 (while the emitter 220 is in a particular rotation position) transmits at least one transmit signal(s) 260 to a target 250 (e.g., a target artifact, such as a white board) (while the target is located in a particular location). In one or more embodiments, the transmit signal(s) 260 is an optical signal(s) or an infrared signal(s).

The transmit signal(s) 260 reflects off of the target 250 to generate at least one reflection signal(s) 270. The receiver 210 of the ranging sensor 205 receives the reflection signal(s) 270. At least one processor 1207 (e.g., refer to FIG. 12) generates a ranging measurement 140 for the target 250 by using the transmit signal(s) 260 and the reflection signal(s) 270 (e.g., via calculating the time of arrival (TOA)). Simultaneously, as the transmit signal(s) 260 reflects off of the target 250, the camera 230 images the target 250 to obtain an imaging measurement 150, which corresponds to the ranging measurement 140, on the image plane 120 of the camera 230.

It should be noted that the emitter 220 may be scanned to other rotation positions such the transmit signal(s) 260 hits different locations of the target 250, and the target 150 may be moved to different range locations that are further or closer in distance to the ranging sensor 205.

In addition, it should be noted that the processor(s) 1207 may be located within the ranging sensor 205, within the camera 230, or remote from the ranging sensor 205 and the camera 230. In addition, there may be multiple processors 1207 that may be located in different locations from each other. In at least one embodiment, the ranging sensor 205 and the camera 230 are housed together and/or mounted together. In other embodiments, the ranging sensor 205 and the camera 230 are located at separate locations, as is shown in FIG. 2.

Figure 3:
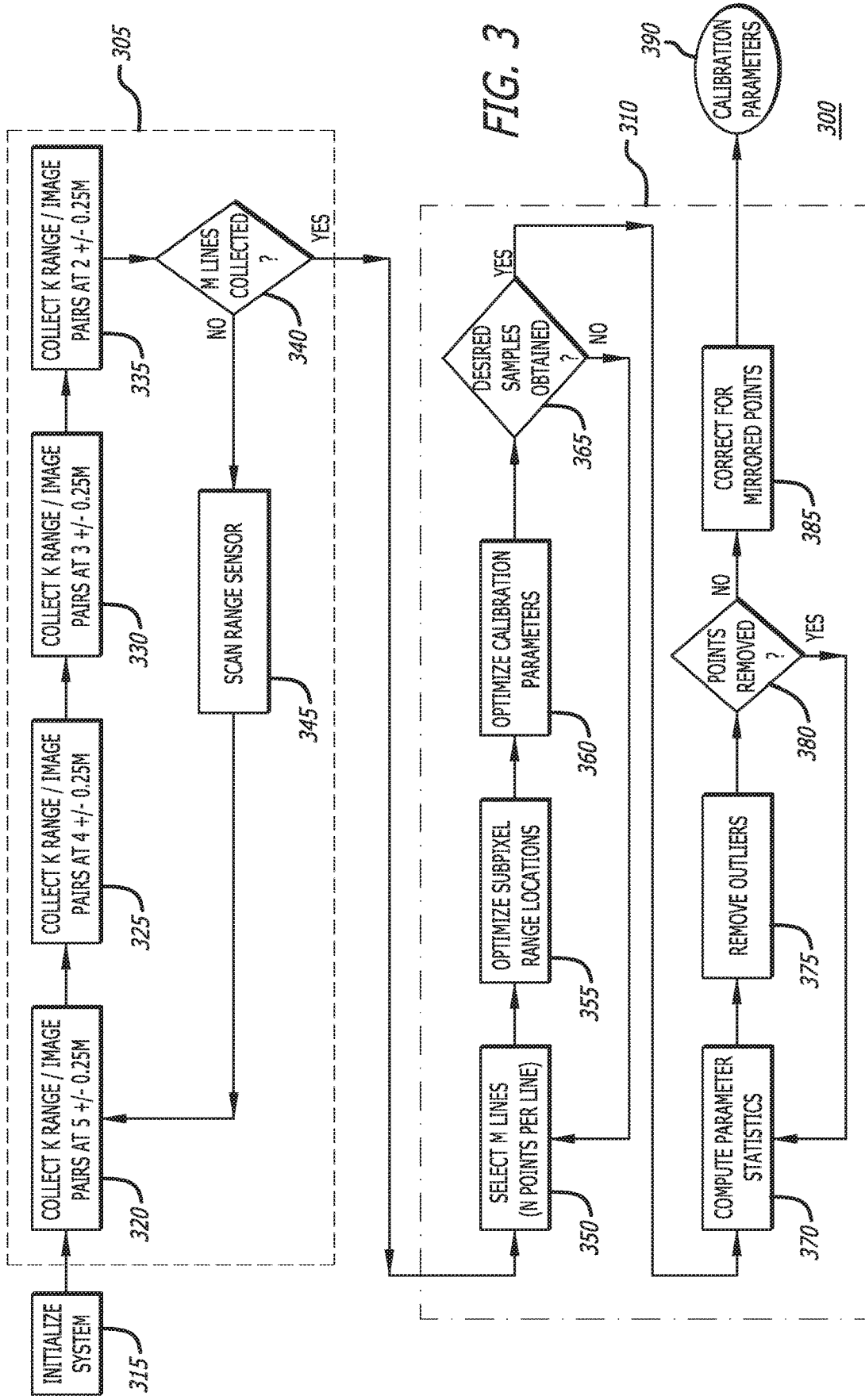
FIG. 3 is a block diagram showing the disclosed method for calibration between a camera and a ranging sensor, in accordance with at least one embodiment of the present disclosure.

A block diagram outlining the disclosed method 300, which comprises a physical process 305 and an algorithmic process 310, is shown in FIG. 3. The goal of the physical process 305 is to take a series of measurements that yields M (e.g., four (4)) number of distinct lines defined by N (e.g., four (4)) number of points each. Multiple samples of each of the N points are collected so that the estimate for the final calibration parameters can be statistically refined. It has been determined empirically through simulation that M=4 lines and N=4 points marked the point of diminishing returns for accuracy versus time spent on calibration. By taking K number of samples, where K=4, for each point, 256 correlated samples are generated, with which to estimate the final calibration parameters.

Referring to the physical process 305 of the method 300 of FIG. 3, the system is initialized 315 by collecting ranging and imaging measurements for a target 250 (refer to FIG. 2) located at N (e.g., four (4)) number of locations with an emitter 220 (refer to FIG. 2) of a ranging sensor 205 (refer to FIG. 2) located in M (e.g., four (4)) number of rotation positions (refer to steps 320, 325, 330, 335, 340, and 345).

In particular, during operation of the physical process 305 of the method 300, the emitter 220 of the ranging sensor 205 is scanned such that it is located in M (e.g., four (4)) number of rotation positions. When the emitter 220 is in each of the rotation positions, ranging measurements 140 (as well as imaging measurements 150) are taken while the target 250 is located in four locations (e.g., 5+/−0.25 meters(m), 4+/−0.25 m, 3+/−0.25 m, and 2+/−0.25 m) away from the ranging sensor 205. For each location that the target is located (e.g., 5+/−0.25 meters(m), 4+/−0.25 m, 3+/−0.25 m, and 2+/−0.25 m), K number (e.g., four (4)) pairs of ranging measurements/ imaging measurements are be obtained (refer to steps 320, 325, 330, 335, 340, and 345).

Referring to the specific steps of the physical process 305 of the method 300 of FIG. 3, at step 320, while the emitter 220 is located in a first position (1), four ranging measurement/imaging measurement pairs 140, 150 are taken of the target 250 for the range sensor 205. The target 250 is moved in range between each measurement, but is kept within 5+/−0.25 meters (m) of the ranging sensor 205.

Figure 4:
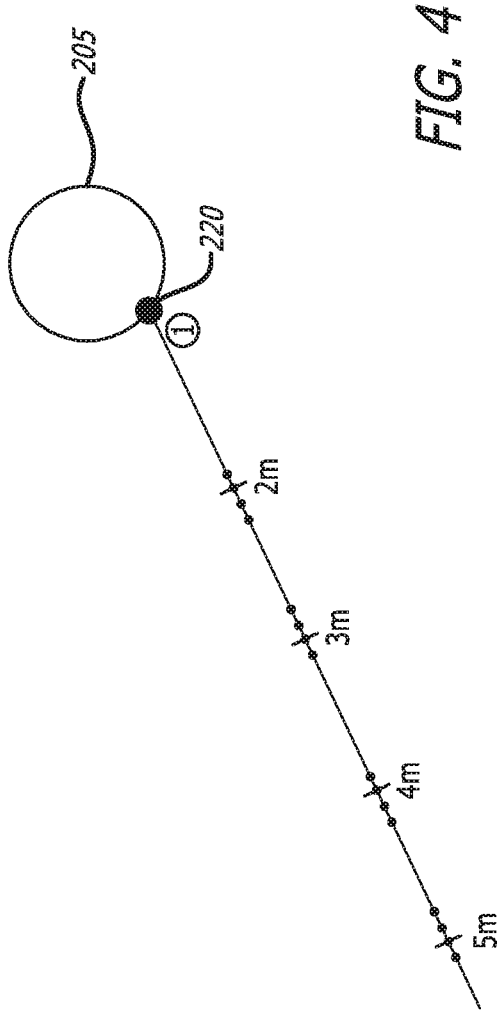
FIG. 4 is a diagram showing ranging measurements taken when the target is located at four different locations, while the emitter (of the ranging sensor) is located in a first rotation position (1), in accordance with at least one embodiment of the present disclosure.

Then, at step 325, while the emitter 220 is still located in a first position (1), step 320 is repeated while the target 250 is located within 4+/−0.25 meters of the ranging sensor 205. At step 330, while the emitter 220 is still located in a first position (1), step 320 is repeated while the target 250 is located within 3+/−0.25 meters of the ranging sensor 205. Then, at step 335, while the emitter 220 is still located in a first position (1), step 320 is repeated while the target 250 is located within 2+/−0.25 meters of the ranging sensor 205. Refer to FIG. 4, which shows ranging measurements 140 taken when the target 250 is located at four different locations while the emitter 220 (of the ranging sensor 205) is located in a first rotation position (1)).

Then, at step 340, at least one processor 1207 (e.g., refer to FIG. 12) determines whether M (e.g., four (4)) number of lines of measurements have been collected. If the processor(s) 1207 determines that M number of lines of measurements have not been collected, the emitter 220 (of the ranging sensor 205) is scanned such that the emitter 220 is now located in the next rotation position (e.g., a second rotation position (2)).

It should be noted that the scan angle should be selected to maximize the space between the lines, while still ensuring all of the points will remain within the camera's 230 field of view (FOV). Note that for a lidar or time-of-flight ranging sensor, it is possible to simultaneously collect data for all three lines, and the emitter 220 will not need to be scanned to subsequent rotation positions.

Figure 5:
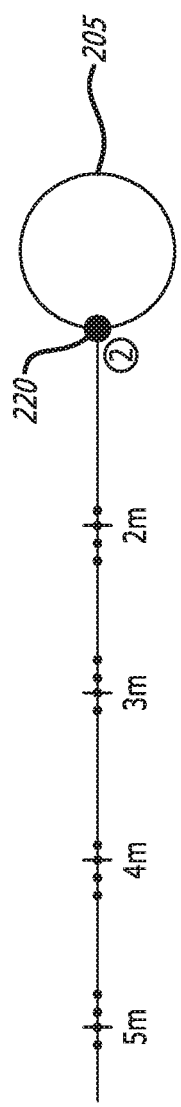
FIG. 5 is a diagram showing ranging measurements taken when the target is located at four different locations, while the emitter (of the ranging sensor) is located in a second rotation position (2), in accordance with at least one embodiment of the present disclosure.

Referring back to the physical process 305 of the method 300, after the emitter 220 has been scanned to the next rotation position, steps 320, 325, 330, 335 are performed while the emitter 220 is located in the next rotation position (e.g., a second rotation position (2)). Refer to FIG. 5, which shows ranging measurements 140 taken when the target 250 is located at four different locations while the emitter 220 (of the ranging sensor 205) is located in a second rotation position (2)).

Figure 6:
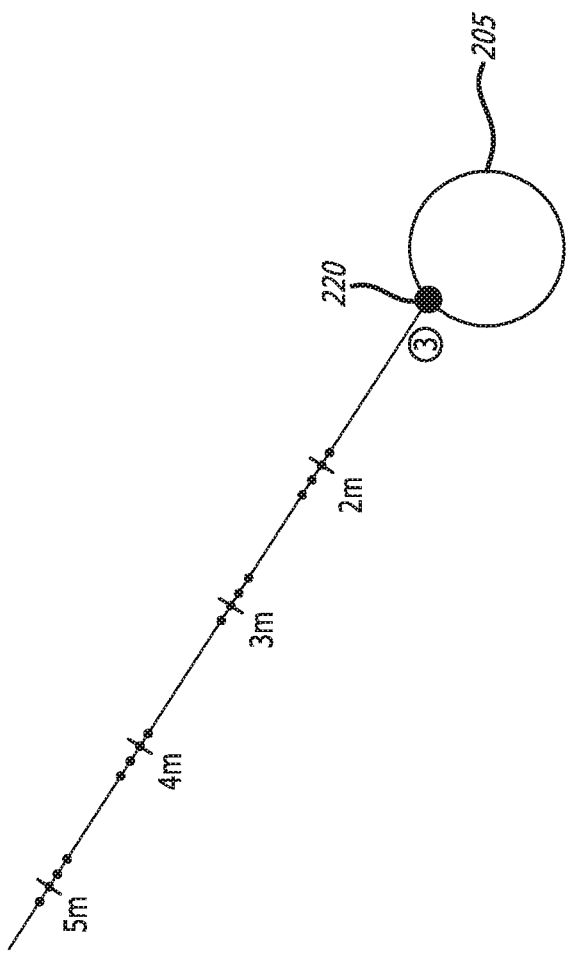
FIG. 6 is a diagram showing ranging measurements taken when the target is located at four different locations, while the emitter (of the ranging sensor) is located in a third rotation position (3), in accordance with at least one embodiment of the present disclosure.
Figure 7:
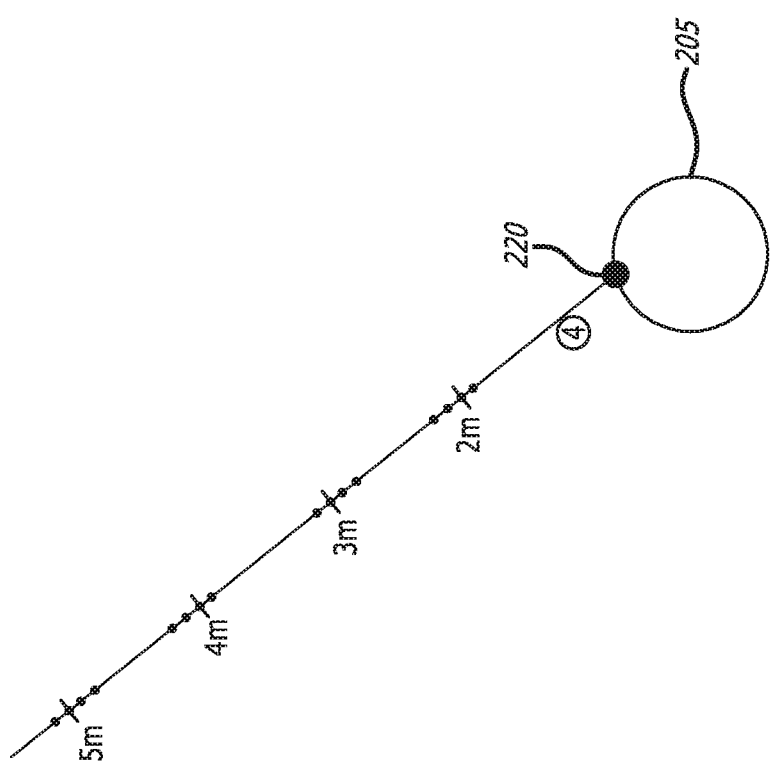
FIG. 7 is a diagram showing ranging measurements taken when the target is located at four different locations, while the emitter (of the ranging sensor) is located in a fourth rotation position (4), in accordance with at least one embodiment of the present disclosure.
Figure 8:
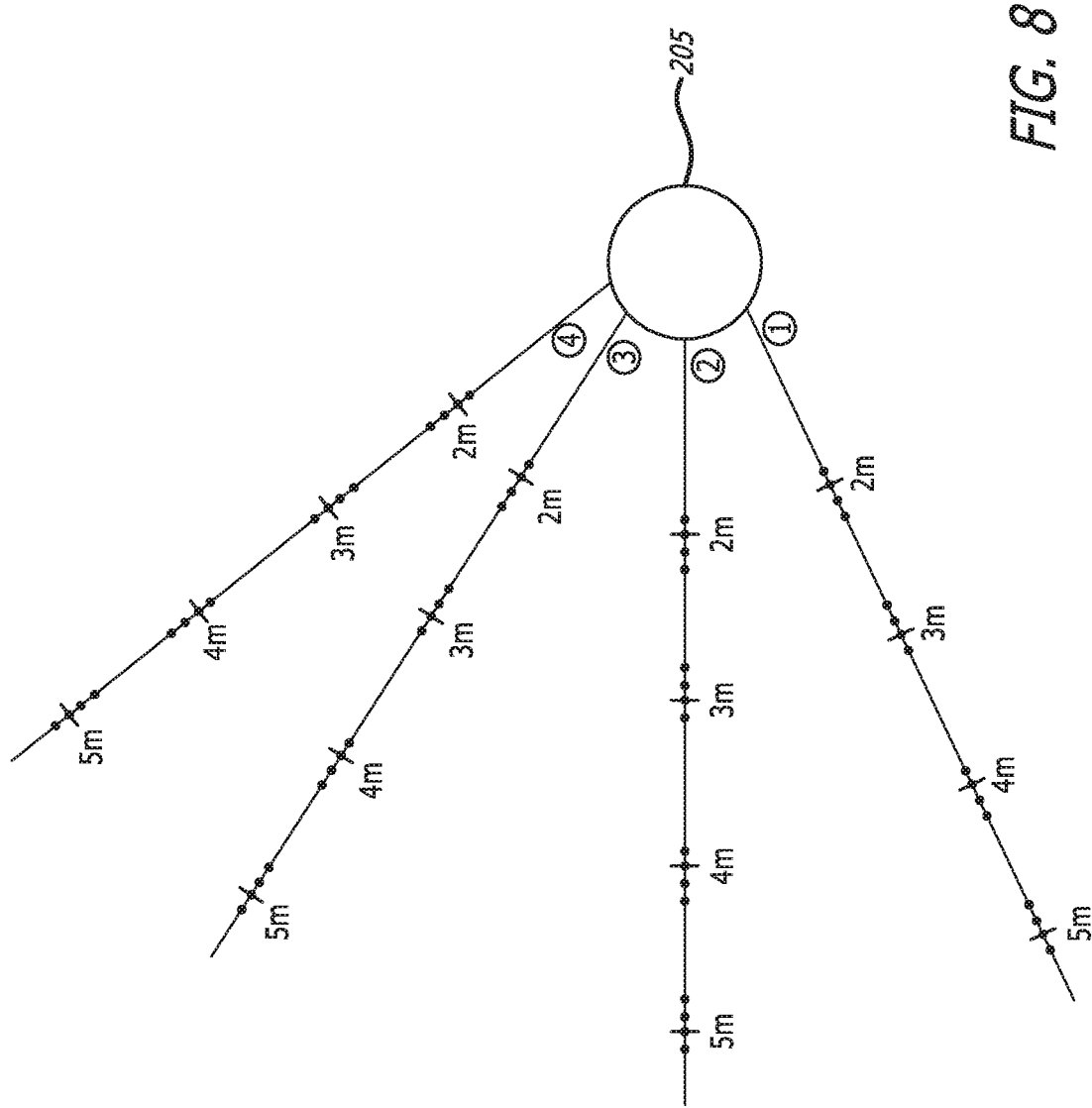
FIG. 8 is a diagram showing the conglomeration of all of the ranging measurements taken (i.e. a conglomeration of the ranging measurements from FIGS. 4, 5, 6, and 7) when the target is located at four different locations, while the emitter (of the ranging sensor) is located in all four of the rotation positions, in accordance with at least one embodiment of the present disclosure.

Then, at step 340, at least one processor 1207 (e.g., refer to FIG. 12) again determines whether M (e.g., four (4)) number of lines of measurements have been collected. If the processor(s) 1207 determines that M number of lines of measurements have not been collected, the emitter 220 (of the ranging sensor 205) is scanned such that the emitter 220 is now located in the next rotation position (e.g., a third rotation position (3)). And steps 320, 325, 330, and 335 of the physical process 305 of the method 300 are repeated. Refer to FIG. 6, which shows ranging measurements 140 taken when the target 250 is located at four different locations while the emitter 220 (of the ranging sensor 205) is located in a third rotation position (3)). The physical process 305 will continue to repeat until the processor(s) 1207 determines that M number of lines of measurements have been collected. Refer to FIG. 7, which shows ranging measurements 140 taken when the target 250 is located at four different locations while the emitter 220 (of the ranging sensor 205) is located in a fourth rotation position (4)). Also refer to FIG. 8, which is a diagram showing the conglomeration of all of the ranging measurements 140 taken (i.e. a conglomeration of the ranging measurements 140 from FIGS. 4, 5, 6, and 7) when the target 250 is located at four different locations while the emitter 220 (of the ranging sensor 205) is located in all four of the rotation positions (i.e. rotation positions (1), (2), (3), and (4)).

Then, at step 340, once the processor(s) 1207 determines that M number of lines of measurements have been collected, the method 300 proceeds to the algorithmic process 310 to compute the calibration parameters. This is accomplished by optimizing two constrained, non-linear objective functions in series. The first solution determines sub-pixel locations for each of the range locations observed by the camera 230. The objective function is a least-squares fit (e.g., performed by processor(s) 1270) constrained so that the output points (e.g., replacement ranging measurements) lie in straight lines and the lines all lie in a single plane.

The second solution takes the sub-pixel locations as its input and yields a solution to the calibration problem. The objective function for this problem is given by Equation 14 in the Mathematical Details section; the constraints are that all perspective mapping coefficients from the measured points should match the solution parameters.

Referring to the algorithmic process 310 of the method 300 of FIG. 3, at step 350, the processor(s) 1270 samples the replacement ranging measurements to produce sampled replacement ranging measurements, where the sampled replacement ranging measurements comprise N (e.g., four (4)) number of the replacement ranging measurements for each line (e.g., for each rotation position of the emitter 220). Refer to FIG. 9, which shows a diagram showing the sampled replacement ranging measurements, which all lie within the same plane. The processor(s) 1270 also determines sampled replacement imaging measurements corresponding to the sampled replacement ranging measurements.

Then, at step 355, the first system of constrained, non-linear equations (i.e. Equations 5-9 in the Mathematical Details section) is solved to determine the sub-pixel locations of the observed (by the camera 230) range measurement points. The first system of constrained, non-linear equations is solved by using one of the sampled replacement ranging measurements for each of lines (e.g., Xmp1, Ymp1; Xmp2, Ymp2; Xmp3, Ymp3; and Xmp4, Ymp4) and using the sampled replacement imaging measurements (e.g., Xip1, Yip1; Xip2, Yip2; Xip3, Yip3; and Xip4, Yip4) corresponding to the sampled replacement ranging measurements (e.g., Xmp1, Ymp1; Xmp2, Ymp2; Xmp3, Ymp3; and Xmp4, Ymp4) that are being used. Refer to FIG. 10, which shows a diagram showing one of the sampled ranging measurements (i.e. Xmp1, Ymp1; Xmp2, Ymp2; Xmp3, Ymp3; and Xmp4, Ymp4) for each of the four rotation positions of the emitter 220 (of the ranging sensor 205).

Then, at step 360, the second system of constrained, non-linear equations (i.e. Equations 14-21 in the Mathematical Details section) is solved to determine the calibration parameters (i.e. $D_m$, $\psi$, $\theta$, $\varphi$, $X_0$, $Y_0$) which best fit the input data set. After the calibration parameters are determined, at step 365, steps 350, 355, and 360 are repeated to obtain the desired X (e.g., 256) number of samples (or sets) of the calibration parameters.

Then, after the desired X number of samples of the calibration parameters have been obtained, the algorithmic process 310 of the method 300 proceeds to process the X number of samples of calibration parameters to determine the final calibration parameters. During the processing of the calibration parameters, at step 370, statistics (e.g., the mean and/or standard deviation) of the X number of samples of the calibration parameters are computed. Then, at step 375, outlier samples, which lie more than Z (e.g., three (3)) number of standard deviations away from the mean of each of the calibration parameters, are removed.

Then, at step 380, steps 370 and 375 are repeated until no more outliers are present. At step 385, mirrored points are corrected by removal. Then, the final calibration parameters are outputted at step 390. The final calibration parameters estimate the relationship of the camera 230 to the ranging sensor 205. The final calibration parameters returned comprise $D_m$, which is the perpendicular distance from the measurement plane to the camera focal point; $\psi$, $\theta$, $\varphi$, which are the Euler angles for rotating from the world coordinate frame to the measurement coordinate frame; and $X_0$, $Y_0$, which are the translation parameters for locating the emitter 220 of the ranging sensor 205.

FIGS. 11A and 11B together are a flow chart showing the disclosed method for calibration between a camera and a ranging sensor, in accordance with at least one embodiment of the present disclosure. At the start 1105 of the method, an emitter at M (e.g., four (4)) number of rotation positions transmits transmit signals to a target located at N (e.g., four (4)) number of locations 1110. Then, reflection signals are generated from the transmit signals reflecting off of the target 1115. A ranging sensor then receives the reflection signals 1120. Then, the ranging sensor generates ranging measurements from the reflection signals 1125. A camera images the target to generate imaging measurements corresponding to the ranging measurements 1130.

Then, at least one processor determines replacement ranging measurements by using the ranging measurements such that the replacement ranging measurements all lie in the same plane 1135. At least one processor then samples the replacement ranging measurements to produce sampled replacement ranging measurements, which comprise N number of the replacement ranging measurements for each of the rotation positions of the emitter 1140. Then at least one processor determines sampled replacement imaging measurements corresponding to the sampled replacement ranging measurements 1145.

Then, at least one processor calculates calibration parameters by using one of the sampled replacement ranging measurements for each of the rotation positions of the emitter, and using the sampled replacement imaging measurements corresponding to the sampled replacement ranging measurements for each of the rotation positions of the emitter that are used 1150.

At least one processor then repeats the preceding method steps (i.e. steps 1135, 1140, 1145, and 1150) X−1 number of times to obtain X (e.g., 256) number of sets of calibration parameters 1155. Then, at least one processor processes (e.g., computing statistics (such as calculating the mean and/or standard deviation) and removes outliers from the computed statistics) the X number of sets of calibration parameters to determine final calibration parameters, where the final calibration parameters estimate a relationship of the camera to the ranging sensor 1160. Then, the method ends 1165.

FIG. 12 illustrates a block diagram of an illustrative computing system 1200 suitable for implementing an embodiment of the present disclosure, in accordance with at least one embodiment of the present disclosure. For example, at least one processor (e.g., which may be located within the camera 230 and/or the ranging sensor 205) of the disclosed system may include and/or employ at least a portion of the disclosed computer system 1200. Computing system 1200 includes a bus 1206 or other communication mechanism for communicating information, which interconnects subsystems and devices, such as processor 1207, system memory 1208 (e.g., RAM), static storage device 1209 (e.g., ROM), disk drive 1210 (e.g., magnetic or optical), communication interface 1214 (e.g., modem or Ethernet card), display 1211 (e.g., CRT or LCD), input device 1212 (e.g., keyboard), and cursor control (not shown).

According to one embodiment of the present disclosure, computer system 1400 performs specific operations by processor 1207 executing one or more sequences of one or more instructions contained in system memory 1208. Such instructions may be read into system memory 1208 from another computer readable/usable medium, such as static storage device 1209 or disk drive 1210. In alternative embodiments, hard-wired circuitry may be used in place of or in combination with software instructions to implement the present disclosure. Thus, embodiments of the present disclosure are not limited to any specific combination of hardware circuitry and/or software. In one embodiment, the term "logic" shall mean any combination of software or hardware that is used to implement all or part of the present disclosure.

The term "computer readable medium" or "computer usable medium" as used herein refers to any medium that participates in providing instructions to processor 1207 for execution. Such a medium may take many forms, including but not limited to, non-volatile media, volatile media, and transmission media. Non-volatile media includes, for example, optical or magnetic disks, such as disk drive 1210. Volatile media includes dynamic memory, such as system memory 1208.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the present disclosure, execution of the sequences of instructions to practice the present disclosure is performed by a single computer system 1400. According to other embodiments of the present disclosure, two or more computer systems 1200 coupled by communication link 1215 (e.g., LAN, PTSN, or wireless network) may perform the sequence of instructions required to practice the present disclosure in coordination with one another.

Computer system 1200 may transmit and receive messages, data, and instructions, including program, i.e., application code, through communication link 1215 and communication interface 1214. Received program code may be executed by processor 1207 as it is received, and/or stored in disk drive 1210, or other non-volatile storage for later execution. Computer system 1200 may also interact with a database 1232 within a database system 1231 via a data interface 1233 where the computer system 1200 may store and retrieve information or data of the electronic design into and from the database system 1231.

II. Process Validation

The disclosed methods have been validated extensively in simulation as well as on real hardware in a laboratory. The hardware used for the laboratory validation consisted of a Nikon D750 camera with a 35 millimeter (mm) fixed focal length Sigma ART lens and an Acuity AR2000 rangefinder. The measured artifact utilized was a white board. The rangefinder was "scanned" using a protractor fixed to the table to determine the angular shift. The calibration results and the "truth" hand measurements agreed perfectly to within the tolerance of the "truth" hand measurements.

A simulation of the calibration process was also run using parameters derived from the same hardware used in the laboratory (e.g., sensor dimensions, focal length, pixel sizes, measurement distribution of the rangefinder, etc.). The benefits of this approach are that perfect truth is available, and the simulation can be run many times to thoroughly evaluate the performance. The results of the simulation were that it was possible to measure the distance from the camera image plane to a point (up to 20 feet (ft) away) with a mean maximum absolute error of 233.3 micrometers (μm) (~0.009 inches (in)) using the computed extrinsic calibration. Furthermore, it was found that if the calibration procedure was performed twice and the resulting parameters averaged, it was possible to achieve a mean maximum absolute error of 145.3 μm (~0.0057 in).

III. Mathematical Details of the Disclosed Methods

A. Defining Coordinate Systems

Two coordinate systems are defined for use in this derivation, both of them right-handed systems. The first coordinate system is based upon the image plane of the camera and will be referred to as the image plane (IP) frame. The origin of the system will be the focal point of the camera lens. The axes are aligned so that the Z-axis points away from the camera (towards the imaged objects) and the Y-axis points up (away from the ground). Points lying on the camera image plane will be given by:

$$P_{ip} = <X_{ip}, Y_{ip}, -f_{len}>$$

where $f_{len}$ is the focal length of the camera lens. This coordinate system is illustrated in FIG. 13, and is the reference coordinate system that will contain the locations of both sensors post-calibration and will be used to take system measurements. FIG. 13 is a three-dimensional graph 1300 showing the image plane 120 in the image plane (IP) coordinate system.

The second coordinate system is the measurement plane (MP) frame. The origin of the MP coordinate system is also the focal point of the camera lens. The measurement plane itself is defined by taking a series of coplanar measurements (by scanning a rangefinder, selecting a lidar scan line, etc). The Y-axis of the MP coordinate system points in the direction of the first measured point, and the Z-axis is normal to the measurement plane and points from the measurement plane away from the camera focal point. Points lying on the measurement plane will be given by:

$$P_{mp} = <X_{mp}, Y_{mp}, D_m>$$

where $D_m$ is the perpendicular distance from the measurement plane to the camera focal point. The MP coordinate system is shown in FIG. 14. FIG. 14 is a three-dimensional graph 1400 showing the measurement plane 110 in the measurement plane (MP) coordinate system.

Computing the final extrinsic calibration parameters requires solving two separate, constrained non-linear optimization problems. The first non-linear optimization problem accounts for the pixel level quantization effects and provides sub-pixel locations for the observed rangefinder measurements. These sub-pixel locations ensure that the planar assumption intrinsic to the second non-linear optimization is met. The second non-linear optimization then provides the solution to the final extrinsic calibration parameters.

Take a series of range measurements from a calibration artifact (e.g., target 250 (refer to FIG. 2)) set at varying depths without altering the emitter 220 (refer to FIG. 2) direction of the ranging sensor 205 (refer to FIG. 2). Simultaneously with each range measurement, capture an image of each point with the camera 230 (refer to FIG. 2) (providing corresponding, quantized pixel locations in IP coordinates). An empirically determined recommendation for the number of measurements is four. More measurements were found to provide rapidly diminishing gains to the final calibration accuracy.

This procedure is repeated at four different angles from the ranging sensor 205 (i.e. providing a total of 16 points in MP coordinates with corresponding quantized IP coordinates). Taking one point from each of the four different measurement angles provides sufficient information to determine a perspective map between the measurement and image planes.

$$X_{ip} = \frac{aX_{mp} + bY_{mp} + c}{gX_{mp} + hY_{mp} + 1} \quad (1)$$

$$Y_{ip} = \frac{dX_{mp} + eY_{mp} + f}{gX_{mp} + hY_{mp} + 1} \quad (2)$$

These two equations (1), (2) and the four measurement points can be combined into a system of linear equations (refer to equation (3) below) in terms of eight unknowns, a-h, and solved using linear algebra techniques (such as Gaussian elimination).

$$\begin{bmatrix} X_{mp1} & Y_{mp1} & 1 & 0 & 0 & 0 & -X_{mp1}X_{ip1} & -Y_{mp1}X_{ip1} \\ X_{mp2} & Y_{mp2} & 1 & 0 & 0 & 0 & -X_{mp2}X_{ip2} & -Y_{mp2}X_{ip2} \\ X_{mp3} & Y_{mp3} & 1 & 0 & 0 & 0 & -X_{mp3}X_{ip3} & -Y_{mp3}X_{ip3} \\ X_{mp4} & Y_{mp4} & 1 & 0 & 0 & 0 & -X_{mp4}Y_{ip4} & -Y_{mp4}X_{ip4} \\ 0 & 0 & 0 & X_{mp1} & Y_{mp1} & 1 & -X_{mp1}Y_{ip1} & -Y_{mp1}Y_{ip1} \\ 0 & 0 & 0 & X_{mp2} & Y_{mp2} & 1 & -X_{mp2}Y_{ip2} & -Y_{mp2}Y_{ip2} \\ 0 & 0 & 0 & X_{mp3} & Y_{mp3} & 1 & -X_{mp3}Y_{ip3} & -Y_{mp3}Y_{ip3} \\ 0 & 0 & 0 & X_{mp4} & Y_{mp4} & 1 & -X_{mp4}Y_{ip4} & -Y_{mp4}Y_{ip4} \end{bmatrix} \begin{bmatrix} a \\ b \\ c \\ d \\ e \\ f \\ g \\ h \end{bmatrix} = \begin{bmatrix} X_{ip1} \\ X_{ip2} \\ X_{ip3} \\ X_{ip4} \\ Y_{ip1} \\ Y_{ip2} \\ Y_{ip3} \\ Y_{ip4} \end{bmatrix} \quad (3)$$

B. Determining Sub-Pixel Locations

The sub-pixel locations of the observed (by the camera 230 (refer to FIG. 2)) range measurements can be determined by utilizing the combined knowledge of the collected points that define a series of 4 lines (given by $y_i = w_{i1} * x_i + w_{i0}$, $i \in [0,3]$), which all lie in a single plane. This information can be formulated as a constrained, nonlinear optimization problem. Let $$\hat{x}_{si} = [x_{si0}, x_{si1}, x_{si2}, x_{si3}]^T$$

$$\hat{y}_{si} = [y_{si0}, y_{si1}, y_{si2}, y_{si3}]^T$$

be the estimated sub-pixel IP coordinates of line $i \in [0,3]$ and let $(x_{mij}, y_{mij})$ be the measurement plane coordinates corresponding to each $(x_{sij}, y_{sij})$.

Furthermore, let $$\overline{w}_i [w_{i1}, w_{i0}]^T$$

be the coefficients found by applying a $1^{st}$ order polynomial curve fit to $\hat{x}_{si}$ and $\hat{y}_{si}$.

Finally define $$\overline{x}_{i_{aug}} = [\hat{x}_{si}, \overline{1}]$$

Then the objective function for the sub-pixel optimization problem is $$f_{obj}(\hat{x}_{s0}, \hat{y}_{s0}, \hat{x}_{s1}, \hat{y}_{s1}, \hat{x}_{s2}, \hat{y}_{s2}, \hat{x}_{s3}, \hat{y}_{s3}) = (\hat{y}_{s0} - \overline{x}_{0_{aug}} \hat{w}_0)^T (\hat{y}_{s0} - \overline{x}_{0_{aug}} \hat{w}_0) \quad (4)$$

And the non-linear constraints are:

$$f_{nlc1}(\ldots) = \sum_{i=0}^{4} = y_{s1j} - (w_{11}x_{s1j} + w_{10}) = 0 \quad (5)$$

$$f_{nlc2}(\ldots) = \sum_{i=0}^{4} y_{s2j} - (w_{11}x_{s2j} + w_{10}) = 0 \quad (6)$$

$$f_{nlc3}(\ldots) = \sum_{i=0}^{4} y_{s3j} - (w_{11}x_{s3j} + w_{10}) = 0 \quad (7)$$

$$f_{nlck}(\ldots) = \frac{ax_{mij} + by_{mij} + c}{gx_{mij} + hy_{mij} + 1} - x_{sij} = 0, \quad (8)$$

$k \in [4, 15]$,
$i \in [0, 3]$,
$j \in [0, 2]$ $$f_{nlck}(\ldots) = \frac{dx_{mif} + ey_{mij} + f}{gx_{m,ij} + hy_{mij} + 1} - y_{sij} = 0, k \in [16, 27], \quad (9)$$

$i \in [0, 3]$,
$j \in [0, 2]$ where the coefficients a-h have been calculated from Eq. (3) using points $(x_{si3}, y_{si3})$ and $(x_{mi3}, y_{mi3})$, $i \in [0,3]$.

C. Computing Calibration Parameters

Select the refined sub-pixel estimates $(x_{si3}, y_{si3})$, $i \in [0,3]$ in IP coordinates and the originally measured $(x_{mi3}, y_{mi3})$, $i \in [0,3]$ points in MP coordinates.

We now make the following definitions. Let $$V_o < X_o, Y_o, Dm >$$

be the vector from the origin of the MP coordinate system to the range sensor emitter and $$V_m = < X_m, Y_m, 0 >$$

be the vector from the emitter to a measured point in the MP coordinate system. Furthermore, let $$R_{mp} = R_x(\phi) R_y(\theta) R_z(\psi) = \begin{bmatrix} R_{11} & R_{12} & R_{13} \\ R_{21} & R_{22} & R_{23} \\ R_{31} & R_{32} & R_{33} \end{bmatrix}$$

be the standard aerospace rotation sequence, which maps the IP coordinate system to the MP coordinate system where:

$$R_z(\psi) = \begin{bmatrix} \cos(\psi) & \sin(\psi) & 0 \\ -\sin(\psi) & \cos(\psi) & 0 \\ 0 & 0 & 1 \end{bmatrix}$$

$$R_y(\theta) = \begin{bmatrix} \cos(\theta) & 0 & -\sin(\theta) \\ 0 & 1 & 0 \\ \sin(\theta) & 0 & \cos(\theta) \end{bmatrix}$$

$$R_x(\phi) = \begin{bmatrix} 1 & 0 & 0 \\ 0 & \cos(\phi) & \sin(\phi) \\ 0 & -\sin(\phi) & \cos(\phi) \end{bmatrix}$$

$$R_{ip} = I_{3 \times 3}$$

We can now find the central projection between the image plane frame (IPF) and measurement plane frame (MPF) coordinate systems as:

$$\begin{bmatrix} X_{ip} \\ Y_{ip} \\ -f_{len} \end{bmatrix} = R_{ip} S R_{mp}^T \begin{bmatrix} X_m + X_o \\ Y_m + Y_o \\ D_m \end{bmatrix} \quad (10)$$

Solving equation (10) for the image plane coordinates and the scale factor, S, we get:

$$S = \frac{-f_{len}}{R_{13}X_m + R_{23}y_m + R_{33}fJ_m + R_{13}X_o + R_{23}Y_o} \quad (11)$$

$$X_{ip} = -f_{len}\left(\frac{R_{11}X_m + R_{21}Y_m + R_{31}D_m + R_{11}X_o + R_{21}Y_o}{R_{13}X_m + R_{23}Y_m + R_{33}D_m + R_{13}X_o + R_{23}Y_o}\right) \quad (12)$$

$$Y_{ip} = -f_{len}\left(\frac{R_{12}X_m + R_{22} + R_{32}D_m + R_{12}X_o + R_{22}Y_o}{R_{13}X_m + R_{23}y_m + R_{33}D_m + R_{13}X_o + R_{23}Y_o}\right) \quad (13)$$

Combining equations (1), (2), (12), and (13) gives us:

$$a = \frac{-f_{len}R_{11}}{R_{33}D_m + R_{13}X_o + R_{23}Y_o}$$

Equations for the remaining coefficients (b-h) can be found in a similar manner. We now have six unknowns ($D_m$, $\psi$, $\theta$, $\phi$, $X_o$, $Y_o$) and eight non-linear equations. We can treat this as a constrained, nonlinear optimization problem by defining an objective function with a single minimum at 0.

$$f_{obj}(D_m, \psi, \theta, \phi, X_o, Y_o) = \left(a + \frac{f_{len}R_{11}}{R_{33}D_m + R_{13}X_o + R_{23}Y_o}\right)^2 \quad (14)$$

The Euler angles are bounded by:

$$\text{-}\pi \leq \phi, \theta, \psi \leq \pi$$

and the nonlinear constraints are defined as:

$$f_{nlc1}(D_m, \psi, \theta, \phi, X_o, Y_o) = b + \frac{f_{len}R_{21}}{R_{33}D_m + R_{13}X_o + R_{23}Y_o} = 0 \quad (15)$$

$$f_{nlc2}(D_m, \psi, \theta, \phi, X_o, Y_o) = c + \frac{f_{len}R_{31}D_m + R_{11}X_o + R_{21}Y_o}{R_{33}D_m + R_{13}X_o + R_{23}Y_o} = 0 \quad (16)$$

$$f_{nlc3}(D_m, \psi, \theta, \phi, X_o, Y_o) = d + \frac{f_{len}R_{12}}{R_{33}D_m + R_{13}X_o + R_{23}Y_o} = 0 \quad (17)$$

$$f_{nlc4}(D_m, \psi, \theta, \phi, X_o, Y_o) = e + \frac{f_{len}R_{22}}{R_{33}D_m + R_{13}X_o + R_{23}Y_o} = 0 \quad (18)$$

$$f_{nlc5}(D_m, \psi, \theta, \phi, X_o, Y_o) = f + \frac{f_{len}R_{32}D_m + R_{12}X_a + R_{22}Y_a}{R_{33}D_m + R_{13}X_o + R_{23}Y_o} = 0 \quad (19)$$

$$f_{nlc6}(D_m, \psi, \theta, \phi, X_o, Y_o) = g - \frac{f_{len}R_{13}}{R_{33}D_m + R_{13}X_o + R_{23}Y_o} = 0 \quad (20)$$

$$f_{nlc7}(D_m, \psi, \theta, \phi, X_o, Y_o) = h - \frac{f_{len}R_{13}}{R_{33}D_m + R_{13}X_o + R_{23}Y_o} = 0 \quad (21)$$

Once we have solved for the unknowns, we can compute the absolute range (depth absolute ($D_{abs}$)) of a point measured by the range sensor to the camera image plane as:

$$D_{abs} = S\sqrt{(X_m + X_o)^2 + (Y_m + Y_o)^2 + D_m^2}$$

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more steps or less steps of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of this disclosure. Many other examples exist, each differing from others in matters of detail only. Accordingly, it is intended that this disclosure be limited only to the extent required by the appended claims and the rules and principles of applicable law.

We claim:

1. A method for calibration between a camera and a ranging sensor, the method comprising:
    obtaining, by the ranging sensor, ranging measurements for a target located at N number of locations with an emitter at M number of rotation positions;
    imaging, by the camera, the target to generate imaging measurements corresponding to the ranging measurements;
    determining, by at least one processor, replacement ranging measurements by using the ranging measurements such that the replacement ranging measurements all lie in a same plane;
    sampling, by the at least one processor, the replacement ranging measurements to produce sampled replacement ranging measurements, which comprise N number of the replacement ranging measurements for each of the rotation positions of the emitter;
    determining, by the at least one processor, sampled replacement imaging measurements corresponding to the sampled replacement ranging measurements; and
    calculating, by the at least one processor, calibration parameters by using one of the sampled replacement ranging measurements for each of the rotation positions of the emitter, and using the sampled replacement imaging measurements corresponding to the sampled replacement ranging measurements for each of the rotation positions of the emitter that are used, wherein the calibration parameters estimate a relationship of the camera to the ranging sensor.

2. The method of claim 1, wherein the method further comprises:
    repeating, by the at least one processor, preceding steps X-1 number of times to obtain X number of sets of the calibration parameters; and
    processing, by the at least one processor, the X number of sets of the calibration parameters to determine final calibration parameters, wherein the final calibration parameters estimate the relationship of the camera to the ranging sensor.

3. The method of claim 2, wherein the processing, by the at least one processor, the X number of sets of the calibration parameters comprises computing statistics of the X number of sets of the calibration parameters.

4. The method of claim 3, wherein the statistics comprise a mean and/or a standard deviation.

5. The method of claim 3, wherein the processing, by the at least one processor, the X number of sets of the calibration parameters further comprises removing outliers from the statistics that are computed.

6. The method of claim 1, wherein the obtaining, by the ranging sensor, the ranging measurements comprises:
   transmitting, by the emitter at M number of the rotation positions, transmit signals to the target located at N number of the locations;
   generating, by the transmit signals reflecting off of the target, reflection signals;
   receiving, by the ranging sensor, the reflection signals; and
   generating, by the ranging sensor, ranging measurements from the reflection signals.

7. The method of claim 6, wherein the transmit signals are optical signals or infrared signals.

8. The method of claim 1, wherein at least two of the image measurements are obtained for each of the locations of the target while the emitter is in one of the rotation positions.

9. The method of claim 1, wherein at least two of the ranging measurements are obtained for each of the locations of the target while the emitter is in one of the rotation positions.

10. The method of claim 1, wherein the at least one processor is located within the camera, within the ranging sensor, or remote from the camera and the ranging sensor.

11. The method of claim 1, wherein the ranging sensor comprises the emitter.

12. A system for calibration between a camera and a ranging sensor, the system comprising:
   the ranging sensor to obtain ranging measurements for a target located at N number of locations with an emitter at M number of rotation positions;
   the camera to image the target to generate imaging measurements corresponding to the ranging measurements; and
   at least one processor to determine replacement ranging measurements by using the ranging measurements such that the replacement ranging measurements all lie in a same plane, to sample the replacement ranging measurements to produce sampled replacement ranging measurements, which comprise N number of the replacement ranging measurements for each of the rotation positions of the emitter, to determine sampled replacement imaging measurements corresponding to the sampled replacement ranging measurements, and to calculate calibration parameters by using one of the sampled replacement ranging measurements for each of the rotation positions of the emitter, and using the sampled replacement imaging measurements corresponding to the sampled replacement ranging measurements for each of the rotation positions of the emitter that are used, wherein the calibration parameters estimate a relationship of the camera to the ranging sensor.

13. The system of claim 12, wherein the at least one processor is further to repeat calibration X−1 number of times to obtain X number of sets of the calibration parameters, and to process the X number of sets of the calibration parameters to determine final calibration parameters, wherein the final calibration parameters estimate the relationship of the camera to the ranging sensor.

14. The system of claim 13, wherein the at least one processor is further to process the X number of sets of the calibration parameters by computing statistics of the X number of sets of the calibration parameters.

15. The system of claim 12, wherein the emitter is further to transmit at M number of the rotation positions, transmit signals to the target located at N number of the locations,
   wherein the transmit signals reflecting off of the target generate reflection signals; and
   the ranging sensor is further to receive the reflection signals, and to generate ranging measurements from the reflection signals.

16. The system of claim 15, wherein the transmit signals are optical signals or infrared signals.

17. The system of claim 12, wherein at least two of the image measurements are obtained for each of the locations of the target while the emitter is in one of the rotation positions.

18. The system of claim 12, wherein at least two of the ranging measurements are obtained for each of the locations of the target while the emitter is in one of the rotation positions.

19. The system of claim 12, wherein the at least one processor is located within the camera, within the ranging sensor, or remote from the camera and the ranging sensor.

20. The system of claim 12, wherein the ranging sensor comprises the emitter.

* * * * *